United States Patent
Armstrong et al.

(10) Patent No.: US 12,254,230 B2
(45) Date of Patent: Mar. 18, 2025

(54) HEAD-MOUNTABLE DISPLAY SYSTEM AND METHODS

(71) Applicant: Sony Interactive Entertainment Inc., Tokyo (JP)

(72) Inventors: Calum Armstrong, London (GB); Mark Jacobus Breugelmans, London (GB); Maurizio Cerrato, London (GB); Philip Cockram, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 265 days.

(21) Appl. No.: 17/894,552

(22) Filed: Aug. 24, 2022

(65) Prior Publication Data

US 2023/0061649 A1 Mar. 2, 2023

(30) Foreign Application Priority Data

Sep. 1, 2021 (GB) .................................. 2112449

(51) Int. Cl.
| | | |
|---|---|---|
| A63F 13/26 | (2014.01) | |
| G06F 3/01 | (2006.01) | |
| G06F 3/14 | (2006.01) | |
| H04N 7/18 | (2006.01) | |

(52) U.S. Cl.
CPC ............... *G06F 3/14* (2013.01); *A63F 13/26* (2014.09); *G06F 3/012* (2013.01); *H04N 7/18* (2013.01)

(58) Field of Classification Search
None
See application file for complete search history.

(56) References Cited

U.S. PATENT DOCUMENTS

| | | |
|---|---|---|
| 2010/0157433 A1 | 6/2010 | Mukawa |
| 2015/0094142 A1 | 4/2015 | Stafford |
| 2016/0214015 A1 | 7/2016 | Osman |
| 2017/0115729 A1 | 4/2017 | Han |
| 2020/0250400 A1 | 8/2020 | Nakamura |
| 2021/0132889 A1* | 5/2021 | Sato ................... G02B 27/0172 |

FOREIGN PATENT DOCUMENTS

| | | |
|---|---|---|
| EP | 1731943 A1 | 12/2006 |
| EP | 3399364 A1 | 11/2018 |
| JP | 2017040694 A | 2/2017 |

OTHER PUBLICATIONS

Combined Search and Examination Report for corresponding GB2112449.0, 6 pages, dated Feb. 22, 2022.
Communication Pursuant to Article 94(3) EPC for corresponding EP22188277.2, 6 pages, dated Apr. 9, 2024.

* cited by examiner

*Primary Examiner* — Damon J Pierce
(74) *Attorney, Agent, or Firm* — Kilpatrick Townsend & Stockton LLP

(57) ABSTRACT

A system includes a head-mountable display (HMD) configured to receive one or more signals via a wired connection with an external device, processing circuitry to generate an output indicative of at least one of a predicted disconnect event and a detected disconnect event for the wired connection, and control circuitry to instruct one or more operations to be performed by the HMD in response to the generated output.

16 Claims, 10 Drawing Sheets

LEFT

RIGHT

HEAD-MOUNTABLE DISPLAY SYSTEM AND METHODS

FIELD OF THE DISCLOSURE

The present disclosure relates to head-mountable display systems and methods. In particular, the present disclosure relates to systems and methods for controlling an HMD connected to an external device via a wired connection in the event of at least one of a predicted disconnect event and a detected disconnect for the wired connection.

DESCRIPTION OF THE PRIOR ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices. This type of HMD can position the actual display device in front of the user's eyes, in association with appropriately configured optical components for directing light from the display device towards the positions of the user's eyes for viewing images displayed by the display device. In this way, the user can view one or more images displayed by the display device via the configured optical components which focus light from the display device onto the user's respective eyes.

An HMD is typically connected to an external device, such as a games console, personal computer or a so-called "break out box", via a wired connection to thereby receive one or more signals such as: one or more signals for powering the HMD, one or more audio signals, one or more video signals, and/or one or more control signals for controlling one or more HMD operations. As such, one or more data processing devices are often provided at a location external to the HMD for delivering one or more signals to the HMD via one or more cables.

One or more cables forming a wired connection between an external device and the HMD can however be problematic in that movements by the user wearing the HMD outside a range of the cable can cause the HMD to become disconnected from the external device thus resulting in a sudden loss of power, or video or audio depending on the signal provided by the cable. For example, while viewing a content a user wearing the HMD may move from one position to another position such that a separation distance between the HMD and the external device exceeds a length of a cable providing the wired connection, thereby resulting in the HMD becoming disconnected from the external device due to a disconnection at one end of the cable and potentially resulting in the external device being displaced due to the physical connection as the user moves their head. Similarly, movements of the user wearing the HMD may cause the cable from the external device to the HMD to become wrapped around the user and/or one or more objects proximate to the user, thereby resulting in the HMD becoming disconnected from the external device even when a separation distance between the HMD and the external device is smaller than the length of the cable.

In the case of a wired connection providing a signal for powering the HMD, the interruption of the wired connection results in an unexpected and sudden loss of power for the HMD and a cessation of audio and video output by the HMD, which can be disconcerting and unsafe for the user wearing the HMD. Similarly, in the case of wired connection providing audio and video signals for output by the HMD (such as using an HDMI cable, for example), the interruption of the wired connection results in an unexpected and sudden loss of video and audio output or graphical and audio glitches (e.g. flickering images).

Therefore there is a need to improve safety for an HMD having a wired connection. The present disclosure seeks to mitigate this problem by providing a system and method for instructing one or more operations to be performed by an HMD in the event of a predicted disconnect event and/or a detected disconnect for a wired connection between the HMD and an external device.

Various aspects and features of the present disclosure are defined in the appended claims and within the text of the accompanying description. Example embodiments include at least a system, a method, a computer program and a machine-readable, non-transitory storage medium which stores such a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
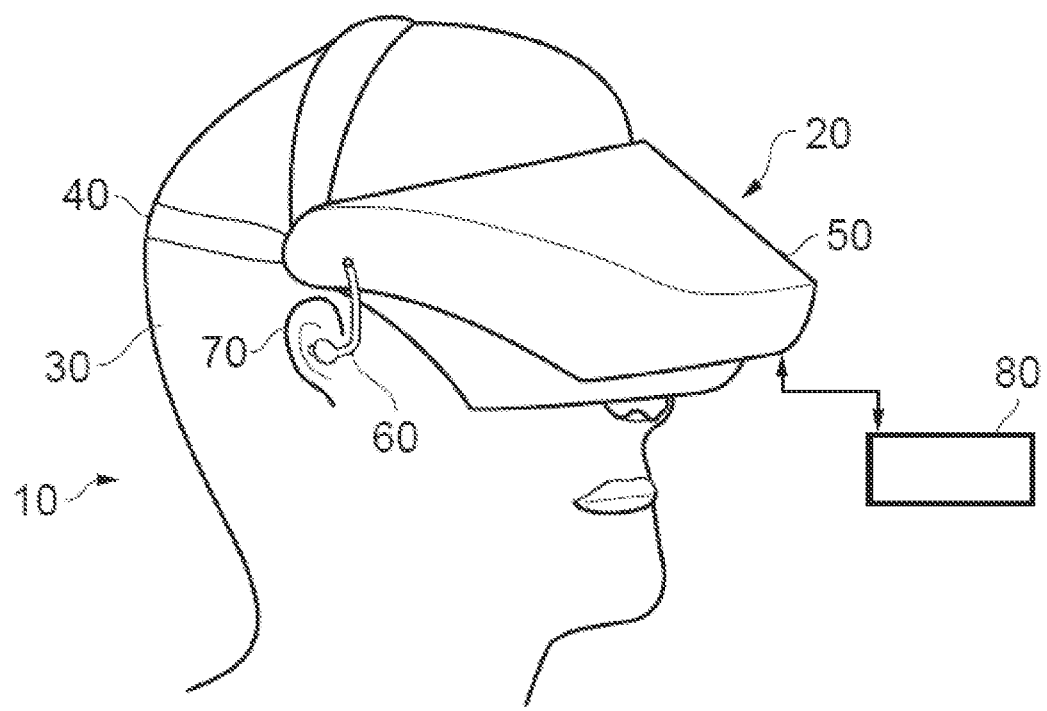
FIG. 1 schematically illustrates an HMD worn by a user.

Referring now to FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself. The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera optionally provided as part of the HMD may capture images to the front of the HMD, in use. Such images may be used for head tracking purposes, in some embodiments, while it may also be suitable for capturing images for an augmented reality (AR) style experience. A Bluetooth® antenna may provide communication facilities or may simply be arranged as a directional antenna to allow a detection of the direction of a nearby Bluetooth® transmitter.

In operation, a video signal is provided for display by the HMD. This could be provided by an external video signal source 80 such as a video games machine or data processing apparatus (such as a personal computer or the PS5®), in which case the signals could be transmitted to the HMD by a wired or a wireless connection. Examples of suitable wireless connections include Bluetooth® connections and an example of suitable wired connections include High Definition Multimedia Interface (HDMI®) and DisplayPort®. Audio signals for the earpieces 60 can be carried by the same connection. Similarly, any control signals passed between the HMD to the video (audio) signal source may be carried by the same connection. Furthermore, a power supply (including one or more batteries and/or being connectable to a mains power outlet) may be linked by a wired connection to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may in some examples be carried by an optical fibre cable. In other embodiments, at least part of the functionality associated with generating image and/or audio signals for presentation to the user may be carried out by circuitry and/or processing forming part of the HMD itself. In some cases, a power supply may be provided as part of the HMD itself.

Some embodiments of the invention are applicable to an HMD having at least one cable linking the HMD to another device, such as a power supply and/or a video (and/or audio) signal source. So, embodiments of the invention can include, for example:

(a) an HMD having its own power supply (as part of the HMD arrangement) but a wired connection (also referred to as a cabled connection) to a video and/or audio signal source;

(b) an HMD having a wired connection to a power supply and to a video and/or audio signal source, embodied as a single physical cable or more than one physical cable;

(c) an HMD having its own video and/or audio signal source (as part of the HMD arrangement) and a wired connection to a power supply; or (d) an HMD having a wireless connection to a video and/or audio signal source and a wired connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation. Accordingly, the arrangement of FIG. 1 provides an example of a head-mountable display comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
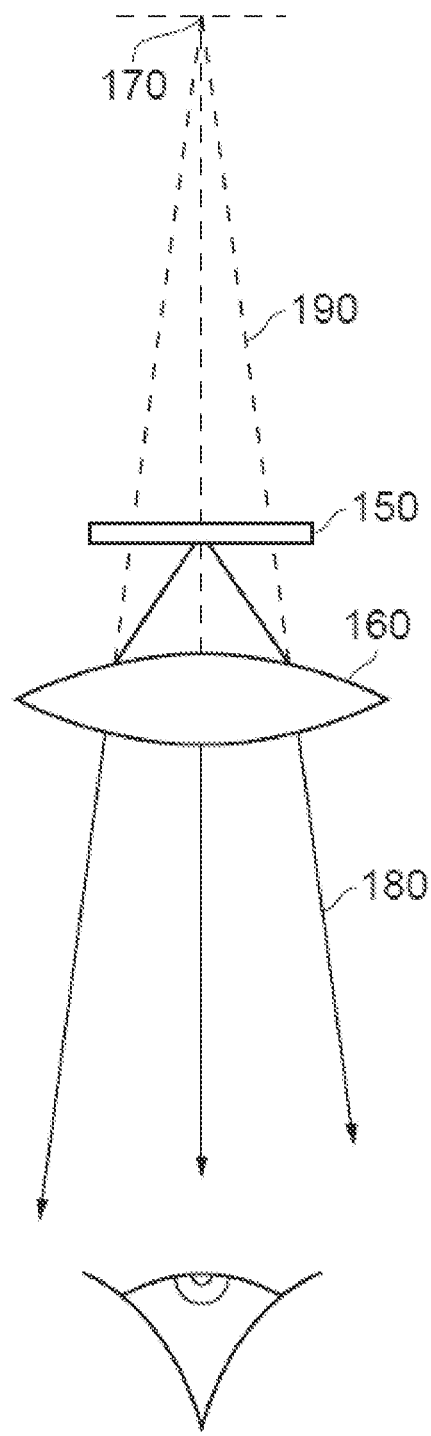
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
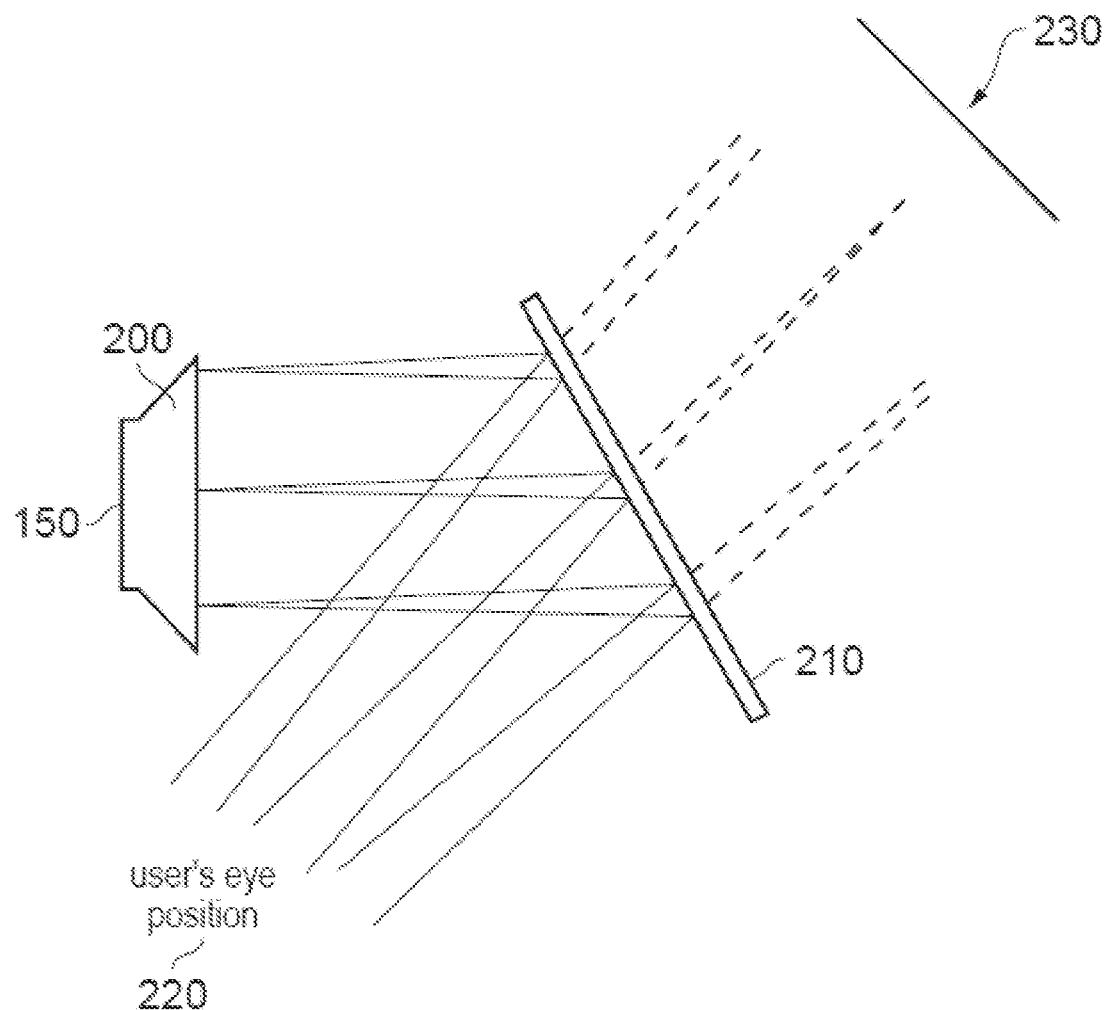
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.
Figure 5:
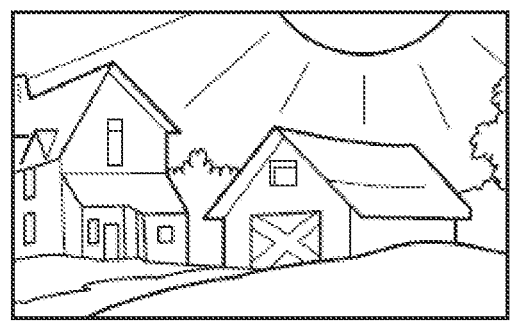

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer. In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located. This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers, gyroscopes and/or magnetometers), external cameras operable to image the HMD, and outwards-facing cameras mounted onto the HMD.

Figure 6:
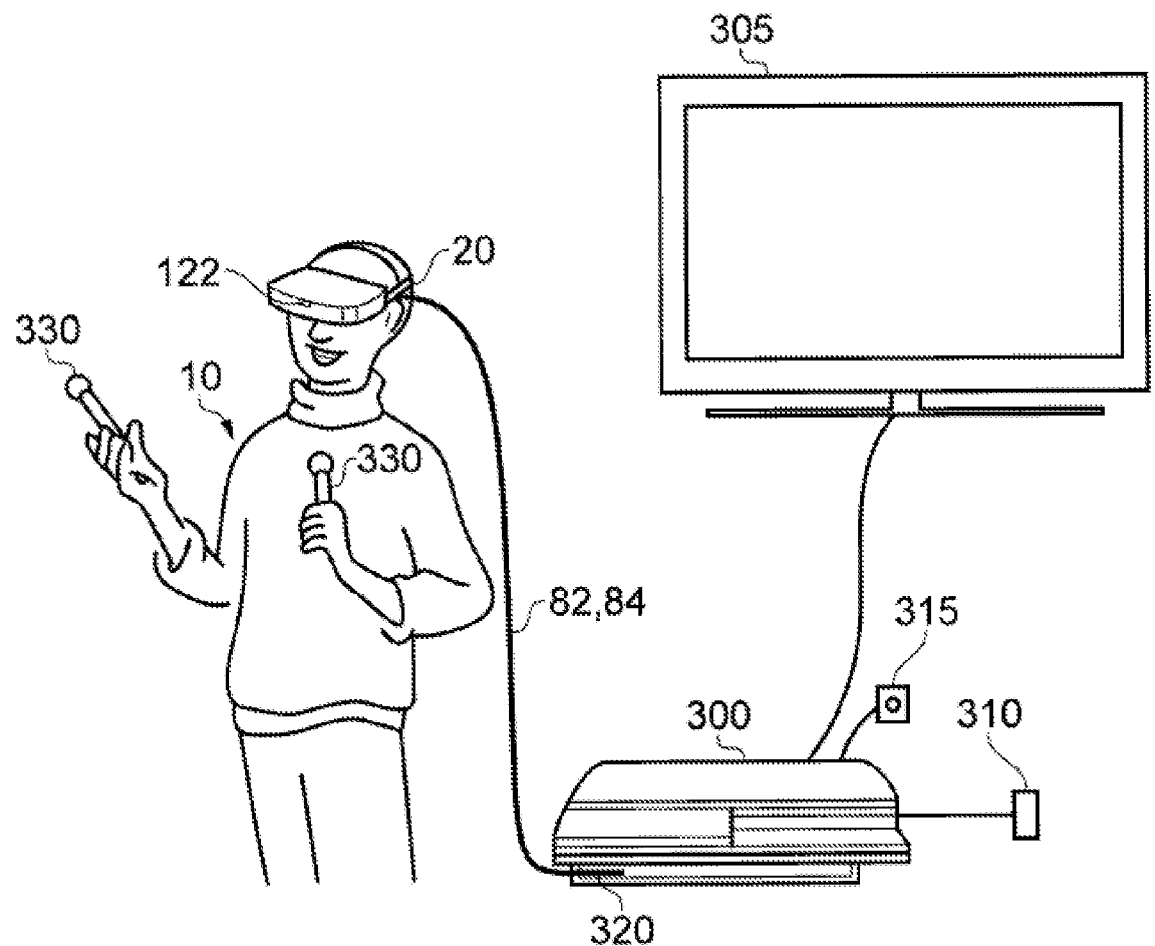
FIGS. 6 and 7 schematically illustrate a user wearing an HMD connected to an external device via a wired connection.

FIG. 6 schematically illustrates an example virtual reality system and in particular shows a user wearing an HMD connected to a games console 300, which is an example of an external device. The games console 300 is connected to a mains power supply 310 and (optionally) to a display screen. One or more cables 82, 84, as discussed above, link the HMD 20 to the games console 300 and is, for example, plugged into a mating portion 320 on the console 300, such as a USB socket or an HDMI® port. Note that a single physical cable can be provided for forming a wired connection between the HMD and the console 300 or a plurality of physical cables may be provided. In some examples, a single physical cable carries a signal for powering the HMD 20 as well as a video signal and an audio signal for outputting video and audio at the HMD, or one or more of these signals may be instead be carried by another physical cable.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 can optionally be passed back to the games console 300 via one or more of the cables 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 may also provide power to the HMD 20, according to the USB standard.

FIG. 6 also shows a optionally provided separate display 305 such as a television or other openly viewable display (by which it is meant that viewers other than the HMD wearer may see images displayed by the display 305) and an image sensor 315, which may be (for example) directed towards the user (such as the HMD wearer) during operation of the apparatus. An example of a suitable image sensor is the PlayStation® Eye camera, although more generally a generic "webcam", connected to the console 300 by a wired (such as a USB) or wireless (such as Wi-Fi® or Bluetooth®) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see a virtual environment (or a subset, version or representation of it) as seen by the HMD wearer. In other examples, the social screen could display other material such as information relating to the HMD wearer's current progress through an ongoing computer game. For example, the HMD wearer could see a virtual environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

Figure 7:
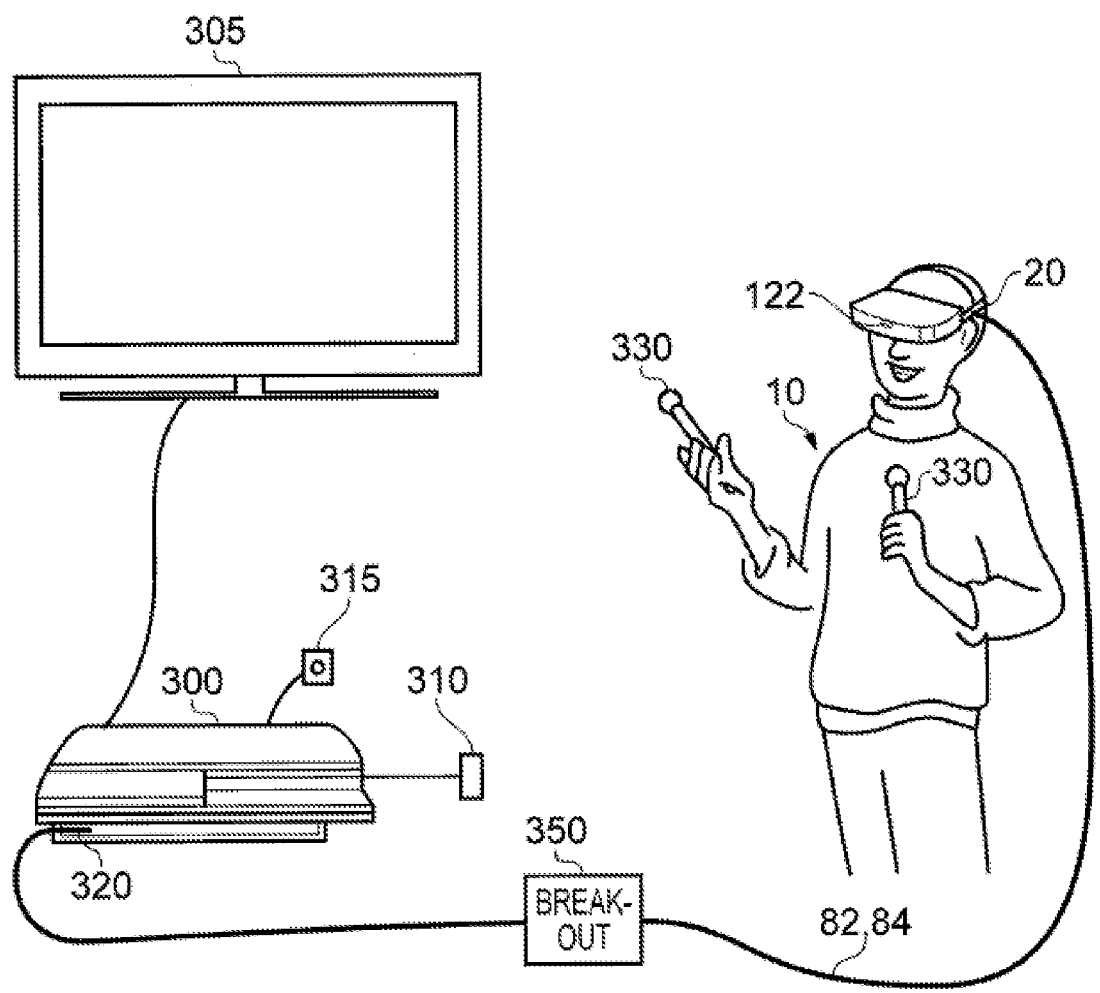

FIG. 7 schematically illustrates a similar arrangement (another example of an HMD system) in which the games console is connected (by a wired link) to a so-called "break out box" acting as a base or intermediate device 350, to which the HMD 20 is connected by one or more physical cables 82, 84. The breakout box can have various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that a cable 82, 84 linking the HMD 20 to the break-out box will tend to move around the position of the break-out box. This can improve user safety and comfort by avoiding the use of very long trailing cables.

In FIGS. 6 and 7, the user is also shown holding a pair of hand-held controllers 330 which may be, for example, Sony® Move® controllers which communicate wirelessly with the games console 300 to control (or to contribute to the control of) game operations relating to a currently executed game program.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
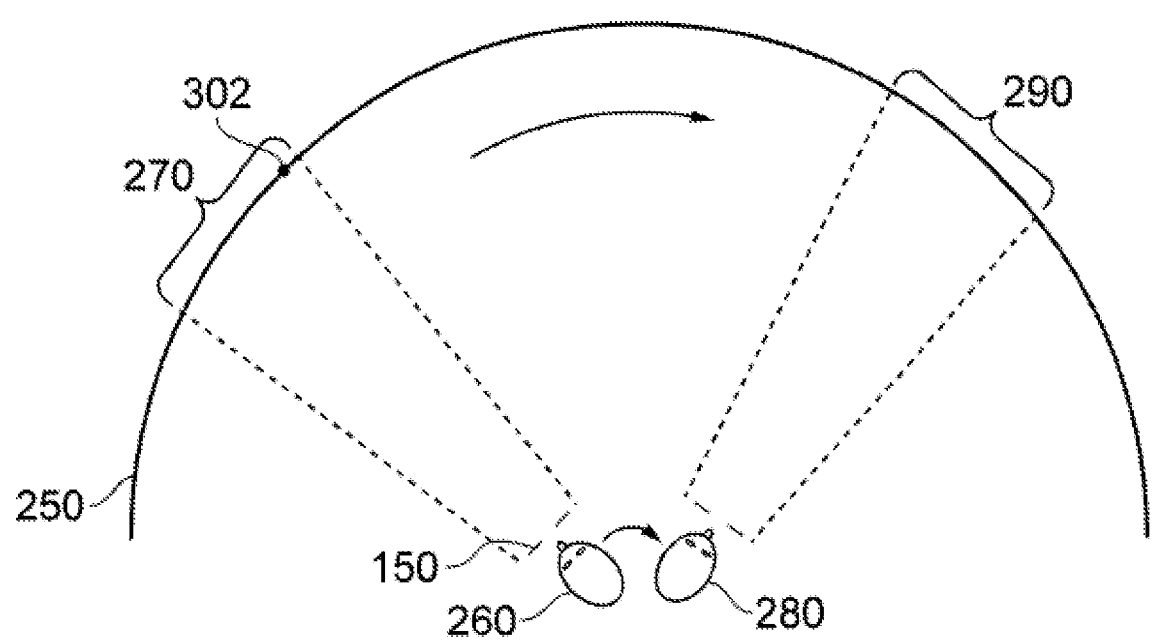
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display units 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
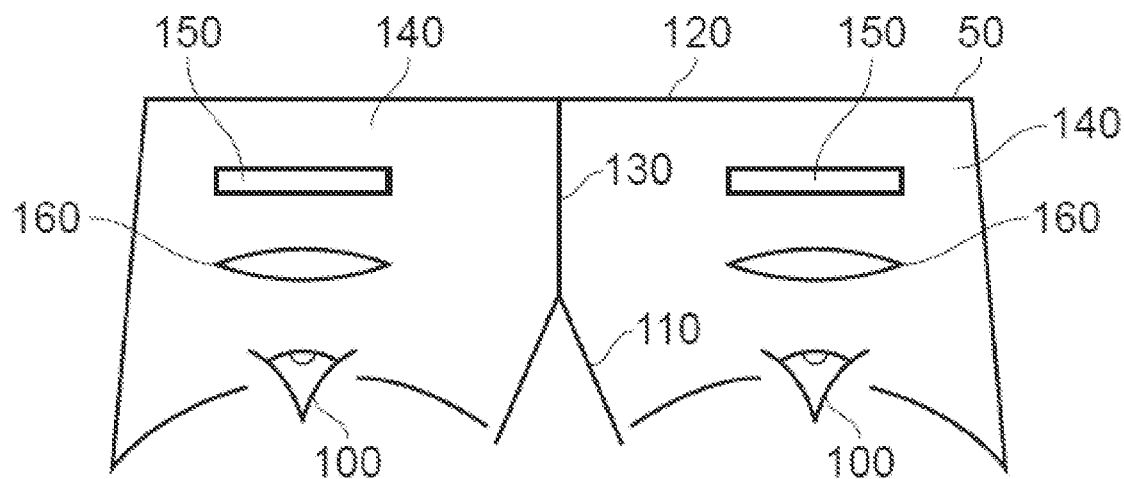
FIG. 2 is a schematic plan view of an HMD.
Figure 9A:
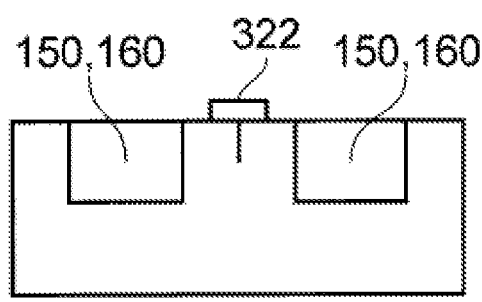
FIGS. 9a and 9b schematically illustrate HMDs with motion sensing.
Figure 9B:
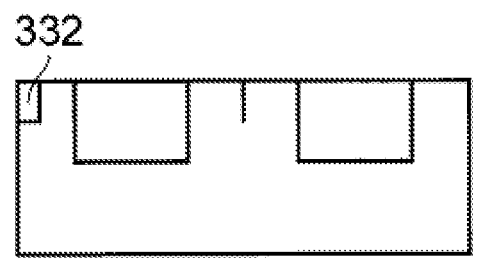

FIGS. 9a and 9b schematically illustrated HMDs with motion sensing. The two drawings are in a similar format to that shown in FIG. 2. That is to say, the drawings are schematic plan views of an HMD, in which the display unit 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
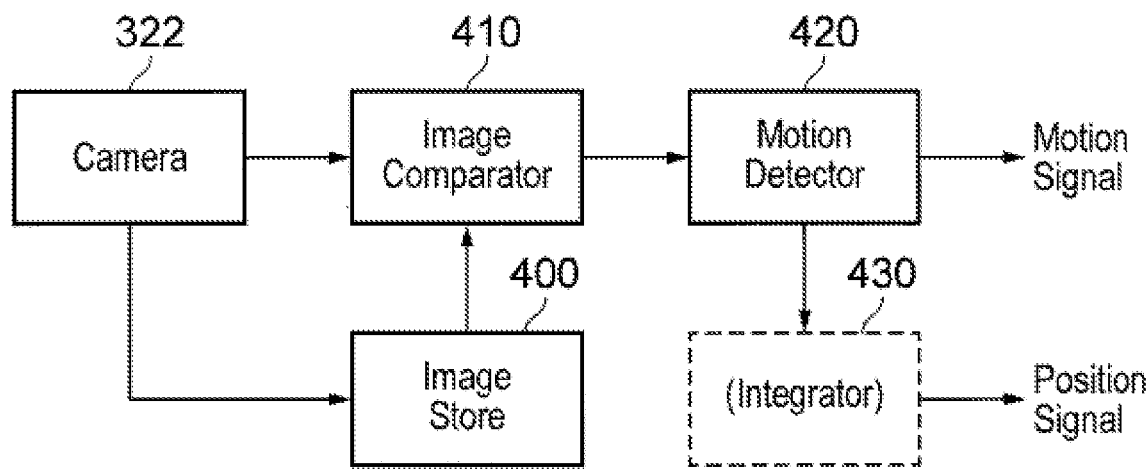
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
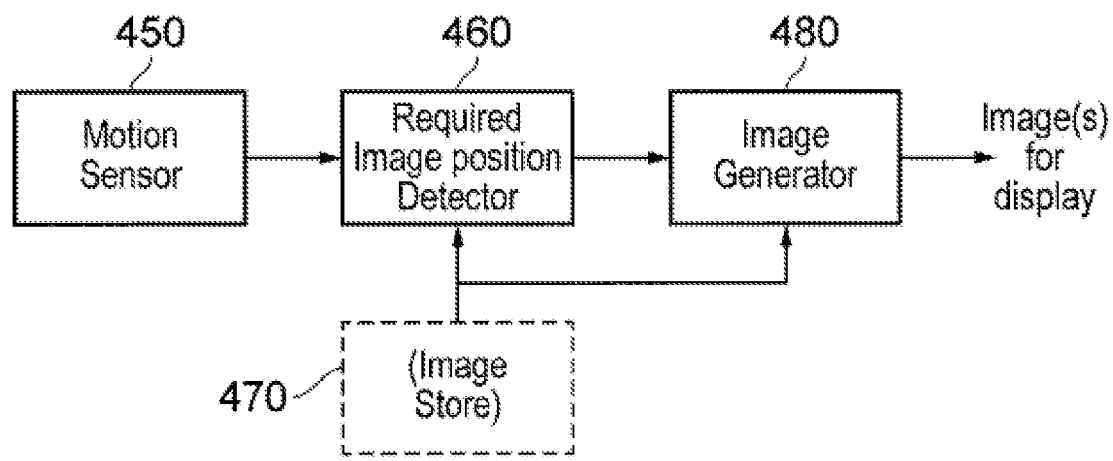
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The operations to be discussed below relate to systems and methods for controlling one or more operations of an HMD in the event of predicting and/or detecting a disconnect event for a wired connection for the HMD with an external device.

Figure 12:
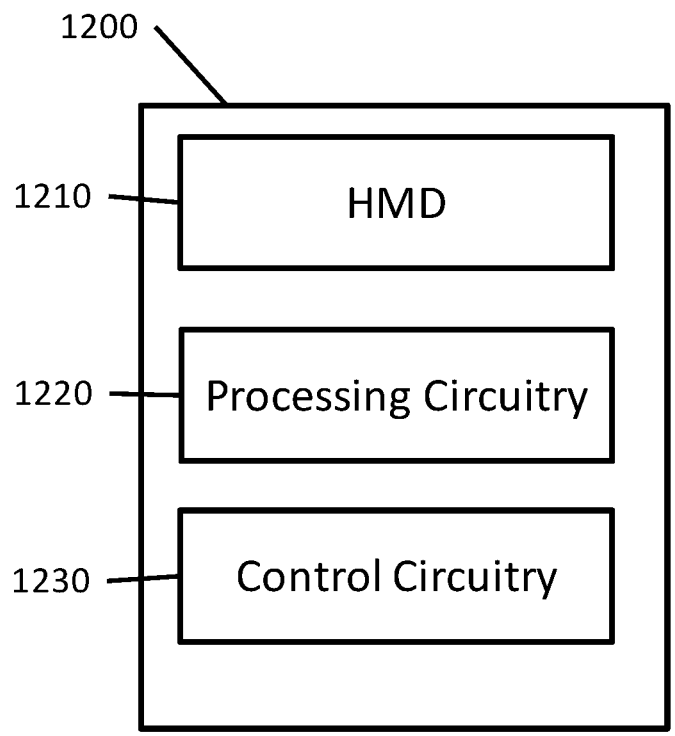
FIGS. 12 and 13 schematically illustrate systems.

FIG. 12 schematically illustrates a system 1200 for instructing one or more operations to be performed by an HMD responsive to a predicted disconnect event and/or a detected disconnect event for a wired connection between the HMD and an external device. In embodiments of the disclosure, the system 1200 comprises: a head-mountable display (HMD) 1210 configured to receive one or more signals via a wired connection with an external device; processing circuitry 1220 to generate an output in response to at least one of a predicted disconnect event and a detected disconnect event for the wired connection; and control circuitry 1230 to instruct one or more operations to be performed by the HMD in response to the generated output.

The HMD 1210 may for example be the same as the HMD 20 described above with reference to FIGS. 1, 6 and 7. The HMD 1210 is configured to receive a portion of a cable for thereby forming an electrical connection with the cable so that one or more signals can be received via the cable. The HMD 1210 thus comprises a mating portion configured to releasably engage a corresponding mating portion of a cable. It will be appreciated that either a plug portion or a socket portion is provided as part of the HMD and a correspondingly shaped plug or socket portion is provided as part of the cable to allow the cable to mate with the HMD 1210. For example, the HMD 1210 may comprise one or more ports that are USB® or HDMI® compatible. The HMD 1210 is thus connectable to a cable to form a wired connection (also referred to as a cabled connection) with another device to which the cable is connected so that one or more signals can be communicated from the another device to the HMD via the cable. In some cases, the cable may optionally also be used for communicating a signal from the HMD 1210 to the external device. Herein the term "wired connection" is used to refer to a connection between the HMD 1210 and an external device that is formed by a signal carrying cable so that one or more signals are carried from the external device to the HMD 1210. As explained previously, signals such as video signals and audio signals can be generated by an external device, such as the external video signal source 80, and communicated to the HMD 1210 via a wired connection and the HMD 1210 can output video and/or audio in dependence upon the received video and/or audio signals. Alternatively or in addition, the HMD 1210 can be configured to receive one or more signals for powering the HMD 1210 from a power supply provided as part of an external device using a wired connection from the HMD 1210 to the external device.

In embodiments of the disclosure, the HMD 1210 is configured to receive one or more signals via the wired connection, in which the one or more signals comprises one or more from the list consisting of: an audio signal; a video signal; and a signal for electrically powering the HMD and/or for charging one or more power sources of the HMD in the case of the HMD comprising a power source. In some examples, a single cable may act as both a power supply cable and an audio and video cable. Alternatively, a first cable may carry a first type of signal and a second cable may carry a second type of signal, in which case the HMD comprises respective mating portions for the respective cables and each cable forms a respective wired connection. Hence more generally, the HMD 1210 is configured to connect to one or more cables to thereby form one or more wired connections with one or more external devices, and the processing circuitry 1220 is configured to generate an output in response to at least one of a predicted disconnect event and a detected disconnect event for a respective cable connected to the HMD 1210.

For a given wired connection that connects the HMD 1210 to an external device, the processing circuitry 1220 is configured to predict a disconnect event and/or detect a disconnect event for that wired connection and to generate an output so that the generated output indicates an occurrence of at least one of a predicted disconnect event and a detected disconnect event for that wired connection. Hence more generally, the generated output indicates that action is to be taken in relation to the connection status of the wired connection because there has been a predicted disconnect event and/or because there has been a detected disconnect event. As discussed later, in some embodiments of the disclosure the generated output is also indicative of either a predicted disconnect event or a detected disconnect event so that the control circuitry 1230 can instruct one or more operations to be performed by the HMD differently in dependence upon whether a disconnect event is predicted or detected. For example, the generated output may take a binary form for indicating an occurrence of at least one of a predicted event and a detected event for the wired connection, or the generated output may comprise information for indicating an occurrence of either a predicted disconnect event or a detected disconnect event.

The HMD 1210 may form a plurality of respective wired connections using a plurality of respective cables and the processing circuitry 1220 can generate an output responsive to a predicted disconnect event and/or a detected disconnect event for each respective wired connection of the plurality of respective wired connections.

The processing circuitry 1220 performs processing operations to predict a disconnect event for a wired connection and generates an output responsive to a predicted disconnect event for the wired connection such that the output is generated by the processing circuitry 1220 prior to the occurrence of the HMD being disconnected from the external device. In this way, the output is generated prior to the occurrence of the disconnect event for the wired connection and the control circuitry 1230 thus instructs one or more operations to be performed by the HMD 1210 responsive to the generated output such that one or more operations can be instructed prior to the disconnect event taking place. In some embodiments of the disclosure, one or more of the operations instructed responsive to the generated output indicative of a predicted disconnect event can be performed to provide guidance to the user wearing the HMD to potentially prevent the HMD from being disconnected from the external device or to at least reduce a likelihood of the HMD subsequently being disconnected from the external device. HMD operations instructed by the control circuitry 1220 responsive to the output generated by the processing circuitry 1220 are discussed in more detail later. Techniques for predicting the disconnect event for the wired connection will be discussed in more detail below.

Alternatively or in addition to generating an output in response to a predicted disconnect event, the processing circuitry 1220 can be configured to detect a disconnect event for a wired connection and generate an output in response to a detected disconnect event for the wired connection. Techniques for detecting the disconnect event for the wired connection will be discussed in more detail below and can be performed to detect a disconnect of a cable at any of the side of the HMD or the side of the external device.

Hence more generally, embodiments of the disclosure include:

i) the processing circuitry 1220 configured to generate an output in response to a predicted disconnect event for a wired connection with an external device;

ii) the processing circuitry 1220 configured to generate an output in response to a detected disconnect event for a wired connection with an external device;

iii) the processing circuitry 1220 configured to generate an output in response to any one of a predicted disconnect event for a wired connection with an external device and a detected disconnect event for the wired connection with the external device; and iv) the processing circuitry 1220 configured to generate a first output in response to a predicted disconnect event for a wired connection with an external device and to generate a second output in response to a detected disconnect event for the wired connection with the external device, in which the first output is indicative of a predicted disconnect event and the second output is indicative of the detected disconnect event.

Hence more generally, in some embodiments the processing circuitry 1220 may perform processing for predicting a disconnect event without performing processing for detecting a disconnect event. Alternatively, in some cases the processing circuitry 1220 may perform processing for detecting a disconnect event without performing processing for predicting a disconnect event.

In embodiments of the disclosure, the processing circuitry 1220 is configured to perform processing for predicting a disconnect event for a wired connection whilst performing processing for detecting a connection status for the wired connection. In this way, the processing circuitry 1220 can perform processing for predicting a disconnect event in parallel with processing for detecting a connection status for the wired connection. In the case of a user wearing the HMD 1210 and movement of the user causing the wired connection for the HMD 1210 with the external device to become disconnected, the processing circuitry 1210 can firstly generate a first output at a first time indicating that a disconnect event is predicted and subsequently generate another output at a second time indicating that a disconnect event has been detected. The control circuitry 1230 instructs one or more operations to be performed by the HMD responsive to an output generated by the processing circuitry 1220, and an operation instructed to be performed by the HMD may be different or may be the same for the first output and the another output.

In some examples, the processing circuitry 1220 and the control circuitry 1230 may each be provided as part of the HMD 1210. Alternatively, the processing circuitry 1220 and the control circuitry 1230 may be provided as part of another device local to the HMD 1210, such as a games console, personal computer or an intermediary device such as the break out box shown in FIG. 7, and the control circuitry 1230 can be configured to communicate with the HMD 1210 via a wireless communication (e.g. Bluetooth®). In some cases, the control circuitry 1230 may be provided as part of the HMD 1210 and the processing circuitry 1220 may be provided as part of another device, such as the external device that communicates with the HMD 1210 via the wired connection and the control circuitry 1230 can be configured to communicate with the processing circuitry 1220 via a wireless connection so that the control circuitry 1230 is responsive to the output generated by the processing circuitry 1220 even when disconnection of the wired connection occurs. In some examples, the functionality of the processing circuitry 1220 may be performed in a distributed manner using a combination of processing devices (for example, a combination of processing performed by an HMD and a personal computer or game console). It will therefore be appreciated that the location of the processing circuitry 1220 and the control circuitry 1230 is not particularly limited.

In embodiments of the disclosure, the processing circuitry 1220 is configured to generate an output indicative of either a predicted disconnect event or a detected disconnect event for the wired connection. In addition to generating the output in response to at least one of a predicted disconnect event and a detected disconnect event for the wired connection, the generated output can also indicate one of the predicted disconnect event and the detected disconnect event so that the control circuitry 1230 can instruct one or more operations to be performed in dependence upon whether there has been a prediction or a detection of a disconnect event. This is discussed in more detail later.

The control circuitry 1230 is configured to instruct one or more operations to be performed by the HMD 1210 in response to an output generated by the processing circuitry 1220. The one or more operations are to be performed by the HMD 1210 responsive to an output generated by the processing circuitry 1220 to improve the safety of the user wearing the HMD 1210 in response to a prediction and/or detection of a disconnect event for a wired connection. As explained above, in some cases a first output may be generated at a first time to indicate a predicted disconnect event for a wired connection and a second output may subsequently be generated at a second time to indicate a detected disconnect event for the wired connection. In some examples, the one or more operations instructed in response to a predicted disconnect event are the same as the one or more operations instructed in response to a detected disconnect event. However, in other examples, the one or more operations instructed responsive to a predicted disconnect event for a wired connection include at least one operation that is different from the one or more operations instructed responsive to a detected disconnect event for the wired connection.

In embodiments of the disclosure, the HMD 1210 comprises a power source (not shown in FIG. 12) for use by the HMD 1210 to perform one or more of the operations instructed by the control circuitry 1230 in response to the generated output indicative of the detected disconnect event. In the case of a wired connection for delivering a signal for powering the HMD (i.e. a power cable forming a wired connection with the HMD), the one or more operations instructed responsive to the prediction and thus prior to the detected disconnect event are capable of being performed by the HMD using the electrical power delivered by the wired connection. However, the one or more operations instructed responsive to the detection of the disconnect event cannot be performed using the electrical power delivered by the wired connection. Embodiments of the disclosure therefore include the HMD 1210 comprising a power source, such as a battery or a super capacitor, for use by the HMD 1210 to perform one or more operations after the cable has been disconnected from the HMD 1210. In some examples, the power source is a dedicated power source for use by the HMD only in the event of a disconnection of a wired connection so that one or more operations can be performed by the HMD to improve the safety of the user.

Figure 13:
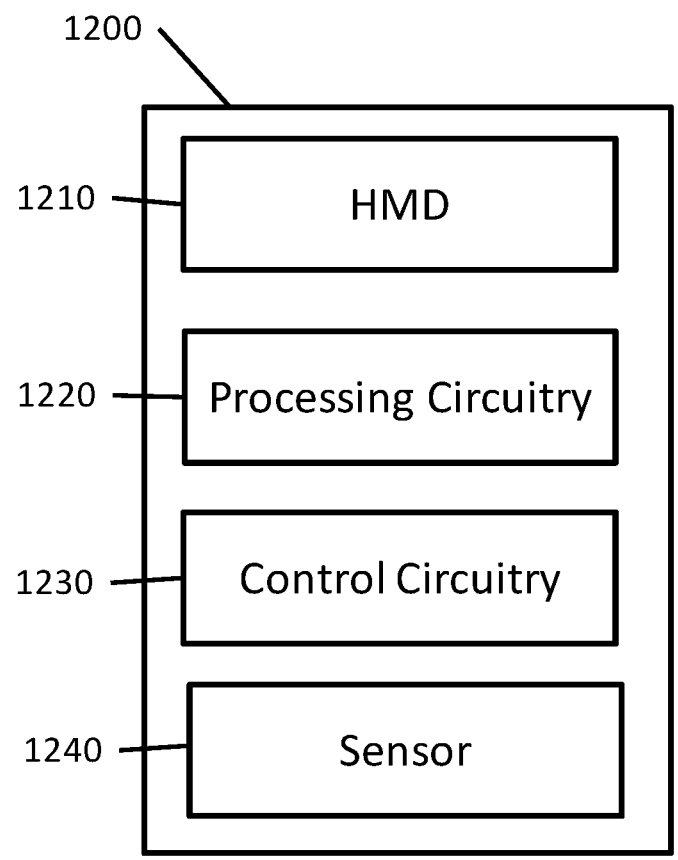

Referring to FIG. 13, in embodiments of the disclosure, the system 1200 comprises one or more sensors 1240 to detect a position of the HMD 1210, wherein the processing circuitry 1220 is configured to predict the disconnect event for the wired connection in dependence upon the position of the HMD. One or more of the sensors 1240 can be provided as part of the HMD 1210 or provided externally to the HMD 1210 as part of another processing device. Each of the one or more sensors 1240 is configured to detect a position of the HMD 1210 so that changes in the position of the HMD 1210 can be tracked. The one or more sensors 1240 comprise one or more from the list consisting of: an image sensor provided as part of the HMD 1210; an image sensor provided externally to the HMD to capture one or more images including the HMD 1210; and one or more inertial sensors provided as part of the HMD 1210.

An image sensor provided as part of the HMD 1210, such as a front-facing camera, may capture images for detecting a position of the HMD using known inside-out tracking techniques. Alternatively or in addition, an image sensor provided externally to the HMD 1210 as part of the external device to which the HMD 1210 is connected via the wired connection or as part of another device local to the HMD can be configured to detect a position of the HMD 1210. For example, the HMD 1210 may comprise one or more optically detectable markers which can be detected in a captured image including the HMD 1210 to thereby detect a position of the HMD. Alternatively or in addition, one or more inertial sensors provided as part of the HMD 1210 can be configured to detect the position of the HMD 1210. Hence more generally, the one or more sensors 1240 may comprise one or more of: a gyroscope, an accelerometer, a magnetometer and an image sensor.

The position of the HMD 1210 can thus be detected and the processing circuitry 1220 can predict a disconnect event for a wired connection of the HMD 1210 with an external device in dependence upon the detected position of the HMD 1210. A predetermined reference position can be defined for the HMD 1210 so that a difference between the detected position of the HMD and the predetermined reference position can be used for predicting a disconnect event for a wired connection. For example, the predetermined reference position for the HMD may be set to correspond to an initial position of the HMD detected by one or more of the sensors 1240 at a time when the user places the HMD 1210 on their head so that deviations from the predetermined reference position can be used for predicting a disconnect event for a wired connection of the HMD 1210. Alternatively, the predetermined reference position for the HMD may be set to correspond to a position of the external device to which the HMD is connected via the wired connection so that changes in the position of the HMD with respect to the position of the external device can be used to predict a likelihood of a disconnect event for the wired connection.

The processing circuitry 1220 may be configured to predict a disconnect event for the wired connection with the external device in dependence upon a distance of the HMD 1210 from the predetermined reference position and a length of the cable forming the wired connection. For example, a front-facing camera mounted on the HMD 1210, as explained above, can be used for detecting a position of the HMD 1210 and can also be used to detect a position of an external device with respect to the position of the HMD 1210 when the external device is included in one or more of the captured images. The external device may be provided with one or more optically detectable markers on its surface for the purpose of detecting a position of the external device. Alternatively or in addition, in the case of an external device (such as a games console) having a camera mounted to capture images including the user wearing the HMD, the captured images can be used to detect a position of the HMD with respect to the position of the camera and thus with respect to the external device. In this way, a position of the HMD relative to a position of the external device can be detected and used for calculating a probability of a disconnect event for a wired connection of the HMD 1210 with the external device.

For example, the processing circuitry 1220 can be configured to generate an output indicative of a predicted disconnect event when a separation distance of the position of the HMD and the predetermined reference position exceeds a predetermined distance. The predetermined distance is set in dependence upon the length of the cable, such that the predetermined distance corresponds to either substantially the length of the cable or a fraction of the length of the cable (e.g. 95% or 90% of the cable length). In this way, when the separation distance of the HMD position and the predetermined reference position is greater than the predetermined distance, the processing circuitry 1220 is configured to generate the output indicating that a disconnect event is predicted for the wired connection. Information regarding a length of a cable forming a wired connection between the HMD 1210 and the external device may be stored in advance so as to be accessible by the processing circuitry 1220, or in other examples the processing circuitry 1220 can be configured to receive information indicative of a cable length in dependence upon a user input. For example, as part of an initial set-up procedure, a user may provide a user input to indicate a length of at least one cable connected to the HMD.

In the case, where the predetermined reference position is set to correspond to an initial position of the HMD detected by one or more of the sensors 1240 at a time when the user places the HMD 1210 on their head, a second predetermined distance (having a value different to the predetermined distance referred to in the previous paragraph) can be used for comparison with a separation distance between the reference position and the detected position of the HMD. The second predetermined distance may be a value set in advance by a user so that when the position of the HMD deviates from the predetermined reference position by more than the second predetermined distance the processing circuitry 1220 predicts a disconnect event for the wired connection of the HMD and generates an output accordingly.

In some embodiments it is considered that previous disconnect events may be used to further refine the prediction process, for instance in identifying particular user actions that more commonly lead to a disconnect on a per-user or per-group basis. Such information can be stored in a user profile, for example, or be associated with a particular processing device or HMD. Alternatively, or in addition, characteristics of a user (such as range of motion and typical motion speeds) may be considered in the prediction so as to characterise the likelihood of a disconnect for a particular user in a given physical configuration. Similarly, a prediction process may be dependent upon known characteristics of an environment such as a layout of obstacles and their identity (for instance, considering whether the object will move if the cable touches it). Hence more generally, the processing circuitry 1220 can be configured to predict a disconnect event for a wired connection between the HMD and an external device in dependence upon detected HMD position and generate an output in response to predicting the disconnect event, in which the generated output may optionally be indicative of the prediction of the disconnect event.

In embodiments of the disclosure, one or more of the sensors 1240 is configured to detect an orientation of the HMD, wherein the processing circuitry 1220 is configured to predict the disconnect event for the wired connection in dependence upon the position and orientation of the HMD with respect to a predetermined reference position and a predetermined reference orientation. In addition to a difference between a position of the HMD and a predetermined reference position, a difference between a detected orientation of the HMD and a predetermined reference orientation may also be used for predicting a disconnect event. Whilst a separation distance between the HMD and the predetermined reference position can be used for reliably predicting a disconnect event, the reliability of the prediction can be further improved by accounting for the orientation of the HMD.

A portion of the HMD that mates with a cable is provided on an external surface of the HMD. The physical position at which the cable enters or joins the HMD is not particularly limited. In some examples, a portion of the HMD that mates with the cable can typically be located at the rear or at either side of the HMD to avoid the cable(s) brushing the user's face in operation. Depending on the orientation of the HMD, the mating portion (e.g. socket portion or plug portion provided on the HMD) may be located on a side of the HMD that is opposite to the side of the HMD facing the external device, or on a side of the HMD facing the external device, or somewhere between these two configurations. Consequently, for a same detected position of the HMD, the configuration of the cable from the external device to the mating portion of the HMD can vary in dependence upon the orientation of the HMD so that for a first orientation (e.g. HMD facing towards the external device and mating portion located at the rear of the HMD) the cable will disconnect from the HMD or the external device at a first separation distance for the HMD and the external device, whereas for a second orientation (e.g. HMD facing directly away from the external device and mating portion located at the rear of the HMD) the cable will disconnect from the HMD or the external device at a second separation distance that is greater than the first separation distance. Hence, the position and orientation of the HMD with respect to a predetermined reference position and a predetermined reference orientation can be used for predicting a disconnect event for a wired connection of the HMD.

The predetermined reference orientation can be the same as has been described above so that the predetermined reference orientation can be set to correspond to a position of the external device or a position of the HMD at a time when the user first places the HMD on their head, as detected by a sensor provided as part of the HMD and/or another sensor, such as a camera configured to capture images including the user wearing the HMD. The predetermined reference orientation can be set to correspond to any orientation set in advance so that a detected orientation of the HMD can be evaluated with respect to the predetermined reference orientation. For example, the predetermined reference orientation for the HMD may be set with respect to an external device to which the HMD is connected via a wired connection so that the predetermined reference orientation corresponds to an orientation in which the HMD faces directly towards an external device, or the predetermined reference orientation may correspond to the detected orientation of the HMD at the time when the user initially places the HMD on their head. For example, the predetermined reference orientation may be set in advance to correspond to an orientation in which the HMD faces towards the external device which may be a display device such as the display device 305 shown in FIGS. 6 and 7.

Hence, the processing circuitry 1220 can predict a disconnect event for the wired connection in dependence upon a difference between a detected position and orientation for the HMD and a predetermined reference position and orientation for the HMD. In some examples, the processing circuitry 1220 can be configured to predict a disconnect event in dependence upon whether a difference between the detected position of the HMD and the predetermined reference position exceeds a threshold distance, wherein a magnitude of the threshold distance varies in dependence upon a difference between the detected orientation of the HMD and the predetermined reference orientation. In this way, the threshold distance can be varied so as to account for changes in the position of the mating portion on the external surface of the HMD with respect to the external device to thereby account for whether the cable has to extend to a portion of the HMD facing towards or away from the external device. A first threshold distance may be used when the detected orientation of the HMD 1210 is substantially the same as the predetermined reference orientation, and a second threshold distance may be used when the detected orientation of the HMD 1210 differs from the predetermined reference orientation, in which the second threshold distance is different from the first threshold difference and a magnitude of the second threshold distance is dependent upon a difference between the detected orientation and the predetermined reference orientation.

In embodiments of the disclosure, the processing circuitry 1220 is configured to calculate a change in an angle of rotation of the HMD with respect to the predetermined reference orientation and to predict the disconnect event for the wired connection in dependence upon the change in the angle of rotation with respect to the predetermined reference orientation. As explained with reference to FIG. 8, when wearing the HMD 1210 and viewing a content displayed by the HMD 1210, such as a virtual environment, the user will typically turn their head and body to view different portions of the content. The processing circuitry 1220 can thus receive information indicative of an orientation of the HMD 1210 from one or more of the sensors 1240 and calculate an angular rotation of the HMD with respect to a predetermined reference orientation. Therefore, changes in the orientation of the HMD 1210 with respect to the reference orientation can be tracked as the user rotates their head and/or body in a clockwise or anti-clockwise direction, and a total change in the angle of rotation of the HMD with respect to the reference orientation can be calculated for use in calculating a probability of the disconnect event for the wired connection of the HMD.

For example, when viewing content, the user wearing the HMD may turn to view a portion of the content initially located off the left-hand side of the displayed image. The user may subsequently turn again to view a portion of the content initially located off the left-hand side of the displayed image. This can result in a situation in which the total anti-clockwise rotation of the user causes the cable connected to the HMD to become wrapped around the user which significantly increases the likelihood of the cable being disconnected because the effective length of the cable is essentially shortened due to some of the length of the cable extending around the user's body. Therefore, the processing circuitry 1220 can calculate a total angular rotation of the HMD with respect to the predetermined reference orientation and update the calculated angle responsive to changes in the detected orientation. For example, in the case where the calculated angle of rotation of the HMD with respect to the reference orientation is 450 degrees, this indicates that the user has performed one complete rotation and an additional 90 degree rotation (in either a clockwise direction or anti-clockwise direction relative to the predetermined reference orientation) and that the cable is wrapped around the user's body.

In embodiments of the disclosure, the processing circuitry 1220 is configured to predict the disconnect event for the wired connection when the angle of rotation of the HMD with respect to the reference orientation exceeds a predetermined angle. Moreover, the processing circuitry 1220 can be configured to predict the disconnect event for the wired connection in dependence upon the change in the angle of rotation of the HMD with respect to the predetermined reference orientation and to generate the output indicative of a predicted disconnect event in dependence upon whether the change in the angle of rotation of the HMD with respect to the predetermined reference orientation exceeds a predetermined angle. A value for the predetermined angle can be freely set and in some cases a value in the range of 180 degrees to 360 degrees may be used. For example, the predetermined angle may be set to a value of 360 degrees so that once the user has performed one complete rotation with respect to the predetermined reference orientation, thereby resulting in the cable being wrapped around the user, the processing circuitry 1220 generates the output indicating a predicted disconnect event and the control circuitry 1230 can instruct one or more operations to be performed by the HMD, such as displaying a warning image and/or outputting an audio signal and/or displaying an image captured by a front-facing camera of the HMD 1210, to reduce the likelihood of the cable subsequently becoming disconnected due to user movements. For example, the HMD 1210 may display a warning image and/or output an audio signal for informing the user to perform a rotation in a given direction to reverse a previously performed movement and thereby perform one or more movements to unwrap the cable. It will be appreciated that the value of the predetermined angle is not limited to 360 degrees. For example, a value of 180 degrees for the predetermined angle may be more appropriate for a relatively short cable, whereas a larger value may be more appropriate for a relatively long cable.

In embodiments of the disclosure, one or more of the sensors 1240 is configured to detect at least one of a position and an orientation of at least a portion of a cable forming the wired connection with the external device, and wherein the processing circuitry 1220 is configured to: generate a model for the cable in dependence upon at least one of the position and the orientation of the portion of the cable; and predict the disconnect event for the wired connection in dependence upon the model. One or more images captured by one or more images sensors provided as part of the HMD 1210 and/or as part of another device local to the HMD 1210 configured to capture images of the environment including the HMD 1210 and the external device can be used for detecting a position and/or orientation of a portion of a length of a cable extending from the external device to the HMD 1210. In most cases, at least some of the length of the cable will be located at a height below the HMD when worn on the user's head and in some cases in contact with a surface of a floor. As such, an image sensor mounted to capture images to the front of the HMD will typically capture one or more images including a portion of the cable and image processing techniques such as contour extraction and colour segmentation can be used to detect the cable in a captured image. In the case of a captured image including a floor having a uniform colour and a cable having a given colour (e.g. black or white), the outline of the cable in the image and the position and orientation of the cable with respect to the camera can be detected.

Hence more generally, one or more portions of a length of a cable forming a wired connection between the HMD and the external device can be detected using one or more captured images, and a position and/or orientation of at least one portion of the cable can be used for generating a model for the cable. As such, using one or more of the detected portions of the cable and a position of the HMD detected by one or more of the sensors 1240, in which the position of the HMD represents an end point for the cable, a model for the cable can be generated for reconstructing a physical configuration of the cable with respect to the HMD so that the processing circuitry 1220 can predict a disconnect event for the cable on the basis of the model providing reconstruction of the cable's physical configuration.

Optionally, one or more of the sensors 1240 may also detect a positon of the external device, which represents a position corresponding to the other end point of the cable (in some cases a detected position of the external device, e.g. using optical markers, may correspond to a position of the end point of the cable or an offset may be used for accounting for the location at which the cable is received by the external device). Therefore, the model of the cable can be generated using the position of the HMD and the position of the external device, which correspond to the two end points of the cable, and one or more detected portions therebetween.

The processing circuitry 1220 can generate the model based on a plurality of detected portions of the cable by estimating a position and orientation for one or more portions of the cable which have not been detected and for which position and orientation information have not been obtained. In a simplest case, an extrapolation between detected portions of the cable can be used to obtain the model of the cable. It will be appreciated that the accuracy of the model is improved by detecting a larger portion of the cable. In some examples, the processing circuitry 1220 can generate the model in dependence upon the detected portions of the cable and the two end points using one or more parameters dependent upon one or more from the list consisting of: a total length of the cable; and a flexibility of the cable (such as a minimum bend radius of the cable). A parameter dependent upon cable flexibility can be used for allowing bends in the length of the cable to be more accurately represented. For example, a minimum bend radius represents a smallest radius that a cable can be bent around and is typically dependent upon cable properties such as cross-sectional area and cable construction properties.

In embodiments of the disclosure, the cable comprises one or more optically detectable markers. One or more optically detectable markers can be provided at one or more portions along the length of the cable which can each be detected in an image captured by an image sensor. In some embodiments of the disclosure, the cable comprises a plurality of optically detectable markers each spaced apart by a predetermined distance along the length of the cable (e.g. a spacing distance of 5 cm or 10 cm may be used between each respective marker). This may be beneficial in that a length associated with a portion of a cable included in a captured image can be calculated in dependence upon a number of respective optically detectable markers included in the image. In particular, in the case where a portion of the cable is tangled or knotted, a length of the tangled/knotted cable in a captured image may be more easily identified by detecting a number of respective optically detectable markers in the captured image.

The one or more optically detectable markers comprise at least one of a passive marker and an active marker, in which passive markers reflect incident light and active markers comprise one or more LEDs for emitting light. Examples of passive optically detectable markers which can be provided on an exterior surface of a signal carrying cable connecting the HMD to an external device include: one or more shapes having a predetermined colour and/or one or more optically reflective markers configured to reflect light. An optically reflective marker that reflects either visible light or infra-red light may be used.

In some embodiments, active markers may be controlled by a processing device so as to convey information to the HMD; for instance, a predetermined operation pattern or colour may be used to signify a predicted or detected disconnect, with a camera associated with the HMD being operable to capture images of the cable to determine such operation. This enables the reliability of the transmission of disconnect information to be improved without the use of a wireless connection or the like; such an approach may be particularly suited to those embodiments in which the HMD is provided with a camera for tracking or the like.

Figure 14:
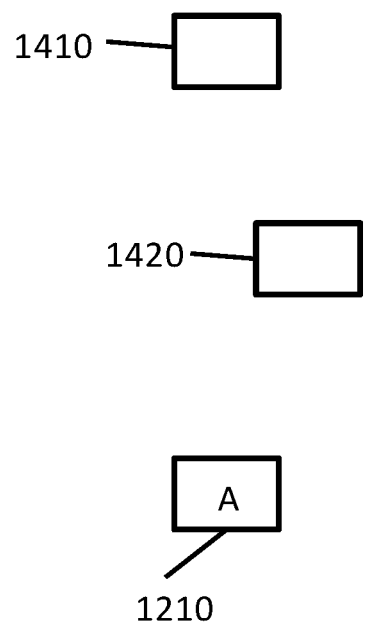
FIG. 14 schematically illustrates an environment including an HMD, an external device and an object.

In embodiments of the disclosure, one or more of the sensors 1240 is configured to detect a position of an object and a position of the external device, and wherein the processing circuitry is configured to predict the disconnect event for the wired connection in dependence upon the position of the HMD 1210, the position of the object and the position of the external device. FIG. 14 schematically illustrates an example of a plan-view of environment including the HMD 1210, an external device 1410 and another object 1420, in which the HMD 1210 is connected to the external device via a cable not shown in the figure. Using one or more of the sensors 1240, a position of the HMD 1210, a position of an object 1410, and a position of an external device 1420 (e.g. the device 300 shown in FIGS. 6 and 7) can each be detected. For example, this may be achieved using a front-facing camera mounted on the front of the HMD 1210, or another image-based sensor located at or proximate to the external device.

FIG. 14 shows an example in which the HMD 1210 is shown as having a position A at a time t1 and a position B at a time t2, where t2 is subsequent to t1 such that the HMD 1210 is initially located at position A and then moves to position B. In the case where the HMD 1210 is located at the position A, the cable can extend in a substantially straight line between the HMD 1210 and the external device 1410 without obstruction from the object 1420. However, in the case where the HMD 1210 is located at the position B, the cable may be obstructed by the object 1420 and may not extend in a substantially straight line between the HMD 1210 and the external device 1410. In particular, when moving from position A to position B, the cable may be restricted to extending from the external device 1410 to the HMD 1210 via a left-side (as shown in FIG. 14) of the object 1420, and as such a maximum straight-line separation distance from the HMD to the external device 1400 at which the HMD becomes disconnected from the external device (due to disconnection of the cable at any of the two ends) is greater for the position A than for the position B.

The processing circuitry 1220 can therefore use the detected positions of the external device 1410, the HMD 1210 and one or more objects 1420 to predict a disconnect event for the wired connection provided by the cable extending from the external device 1400 to the HMD 1210. In particular, the processing circuitry 1220 can calculate a first separation distance between the external device 1410 and the object 1420 and a second separation distance between the object 1420 and the HMD 1210. Therefore, the processing circuitry 1220 can predict a disconnect event for the wired connection in dependence upon whether a sum of the first separation distance and the second separation distance is greater than a predetermined distance. The predetermined distance is set in dependence upon the length of the cable, such that the predetermined distance corresponds to either substantially the length of the cable or a fraction (portion) of the length of the cable (e.g. 95% or 90% of the cable length).

It will be appreciated that the above technique may be similarly implemented for any number of objects that cause an obstruction for the path of the cable from the external device 1410 to the HMD 1210. In some examples, the user's environment may comprise a plurality of objects for which only some of the objects represent an obstruction for the cable. Hence, in embodiments of the disclosure, the processing circuitry 1220 is configured to select one or more objects from a plurality of detected objects and to predict the disconnect event for the wired connection in dependence upon the position of the HMD, the position of the one or more selected objects and the position of the external device, in which the processing circuitry 1220 is configured to select an object in dependence upon whether a portion of the cable contacts the object. One or more captured images can be used by the processing circuitry 1220 to detect whether there is contact between a portion of a cable and an object.

In embodiments of the disclosure, the processing circuitry 1220 is configured to detect the disconnect event for the wired connection in dependence upon one or more from the list consisting of: a change in signal amplitude of one or more of the signals communicated via the wired connection; and an output of a sensor for detecting a mating of a mating portion of either the HMD or the external device with a mating portion of a cable forming the wired connection. An amplitude of a signal communicated to the HMD 1210 via the wired connection can be analysed by the processing circuitry 1220 such that a change in the amplitude of the signal can be used to detect a disconnect event for the cable. In some cases, the movements of the user wearing the HMD 1210 may cause a mating portion of the cable to be partially, but not completely, removed from the corresponding mating portion in the HMD 1210 and/or the external device thus resulting in a deterioration in an amplitude of a signal received by the HMD 1210 via the wired connection. In the case of a cable delivering audio and/or video signals to the HMD, this may result in a loss of information which results in graphical/audio glitches and/or crackling and/or popping sounds being output at the HMD. Therefore, the processing circuitry 1220 can detect a disconnect event in response to a reduction in the signal amplitude and generate an output indicative of a disconnect event so that the control circuitry 1240 instructs one or more operations to be performed by the HMD 1210. The HMD 1210 and/or the external device may comprise a sensor for detecting engagement of a mating portion with a mating portion of a cable and generating an output in dependence upon the engagement. For example, the HMD 1210 may comprise a switch that has a first configuration when the cable is connected to the HMD 1210 and a second configuration when the cable is not connected to the HMD 1210. The switch may be provided as part of a plug portion or socket portion so that the switch has either the first or second configuration depending on whether a portion of the cable is in abutment with the switch.

In embodiments of the disclosure, the control circuitry 1240 is configured to instruct the HMD 1210 to display one or more warning images in response to an output generated by the processing circuitry 1220 to thereby provide the user with a warning in relation to the connection status of the wired connection. The HMD 1210 comprises the display portion 50 for displaying the one or more warning images to the user wearing the HMD 1210. The warning image may comprise text for bringing to the attention of the user the fact that action is needed in relation to the wired connection without specifying whether there has been a prediction or a detection. For example, the warning image may comprise text for requesting a user to check a connection status for a cable, or requesting a user to check whether a cable is being obstructed by an external object. However, in the case where the generated output is indicative of the predicted disconnect event or the detected disconnect event, the warning image may comprise text for indicating an occurrence of a predicted disconnect event or a detected disconnected event, respectively. Hence, more generally the user wearing the HMD can be provided with a visual warning at a time prior to an occurrence of a disconnect event and/or at a time after an occurrence of a disconnect event.

In the case where a disconnect event is first predicted and then a disconnect event is subsequently detected, a warning image can be displayed by the HMD 1210 at a first time and another warning image can be displayed by the HMD 1210 at a second time subsequent to the first time so that the user can be informed of a predicted disconnect event and then informed of a detected disconnect event. In the case where the wired connection is used for carrying one or more power signals for powering the HMD 1210, the HMD can be powered for displaying a warning image in response to detecting the disconnect event using a power source provided as part of the HMD, this is discussed in more detail later.

In some examples, in addition to the one or more warning images, the control circuitry 1240 is also configured to instruct the HMD 1210 to output an audio message to accompany the one or more warning images. Hence, the control circuitry 1240 can be configured to instruct the HMD 1210 to output one or more audio messages in response to an output generated by the processing circuitry 1220 to thereby indicate an occurrence of at least one of a predicted disconnect event and a detected disconnect event.

In embodiments of the disclosure, the generated output is indicative of either the predicted disconnect event or the detected disconnect event, and the control circuitry 1230 is configured to instruct the HMD to display a first warning image in response to the generated output indicative of the predicted disconnect event and to instruct the HMD to display a second warning image in response to the generated output indicative of the detected disconnect event, wherein the first warning image is different to the second warning image. One or more first warning images can be displayed by the HMD 1210 in response to a predicted disconnected event for the wired connection between the HMD 1210 and the external device to provide the user with a visual warning at a time when the HMD is still connected to the external device via the wired connection. One or more second warning images can be displayed by the HMD 1210 in response to a detected disconnect event for the wired connection between the HMD 1210 and the external device to provide the user with a visual warning at a time when the wired connection between the HMD and the external device is disconnected and action is needed to reconnect the cable. The content of the first warning image is different from the content of the second warning image.

The first warning image can thus be displayed to provide the user with visual guidance for potentially preventing, or at least reducing a likelihood, of the HMD subsequently being disconnected from the external device by providing one or more indicators for guiding the user to perform one or more subsequent movements for repositioning the HMD. Moreover, by displaying the first warning image responsive to the predicted disconnect event, one or more subsequent user movements that would have otherwise been performed by the user can potentially be prevented from being performed, and instead one or more guided movements can be performed in accordance with one or more of the first warning images to reposition the HMD in one or more ways that reduce the likelihood of the wired connection between the HMD and the external device subsequently being disconnected. As such, the control circuitry 1240 can instruct the HMD 1210 to display one or more first warning images, in which a first warning image comprises one or more indicators for indicating one or more movements for the HMD 1210. This is discussed in more detail below.

For a case in which the HMD 1210 is currently displaying one or more images for a content, such as a video game, at a time when the processing circuitry generates the output indicative of a predicted disconnect event, the control circuitry 1240 can instruct the HMD 1210 to stop displaying the one or more images for the content and to instead display one or more first warning images. However, it is desirable to display the first warning image in a controlled manner to avoid unsettling the user wearing the HMD 1210. Therefore, in some cases the one or more first warning images may be superimposed with the one or more images for the content so as to avoid a sudden transition of the displayed images which may be disconcerting for the user. By superimposing the first warning image on an image for the content, the user can be informed of the predicted disconnect event without the user experiencing a sudden change and user safety is thus improved.

The second warning image is displayed in response to a detected disconnect event to provide the user with a stable image in the event of a disconnect event instead of the user being provided with either a flickering image due to an improperly connected cable or no image at all. In conventional systems using a cable to communicate one or more signals to an HMD (audio, video and/or power signals), the disconnection of the cable would typically result in an abrupt loss of power at the HMD or at least a sudden loss of displayed content, thereby potentially plunging a user into darkness in the case of a fully-immersive HMD. Therefore in conventional systems, the disconnection of the cable can result in an unsafe situation for the user wearing the HMD in which the user has little or no understanding of their position within the surrounding environment and their vision is at least partially obscured by the HMD. In embodiments of the disclosure, the HMD 1210 is instructed to display one or more second warning images in response to a detected disconnect event, thereby providing the user with improved safety in the event of a disconnect for the cable. For example, the second warning image may comprise one or more text elements for instructing the user to remove the HMD from their head. As explained above, in the case where the wired connection is used for carrying one or more power signals for powering the HMD 1210, the one or more second images can be displayed by the HMD 1210 using a power source provided as part of the HMD 1210. In a manner similar to that described above, in the case of a detected disconnect event, a second warning image may be superimposed with a last displayed image for the content so as to avoid a sudden transition of the displayed images which may be disconcerting for the user.

In embodiments of the disclosure, the first warning image comprises one or more indicators for indicating a movement for the HMD. The control circuitry 1240 can instruct the HMD to display at least one warning image in response to a generated output indicative of a predicted disconnect event so that the at least warning image comprises at least one graphical indicator for indicating at least one of a direction of movement and a direction of head rotation to be performed by the user wearing the HMD. For example, in the case where the processing circuitry 1220 generates an output indicative of a predicted disconnect event in response to detecting that a separation distance of the position of the HMD and the predetermined reference position exceeds a predetermined distance, then the control circuitry 1240 can be configured to instruct the HMD to display a first warning image comprising at least one graphical indicator indicating a direction of movement for the HMD towards the external device or towards an object causing an obstruction for the cable. For example, the at least one graphical indicator may be an arrow or a similar graphical element for providing directional information. In this case, the detected position of the HMD can be periodically evaluated with respect to the predetermined reference position such that a first warning image is displayed by the HMD until the current position of the HMD changes (due to user movements instructed by the one or more first warning images) such that a difference between the current position of the HMD and the predetermined reference position no longer exceeds a predetermined distance, at which point display of the first warning image can be stopped.

Alternatively or in addition, in the case where the processing circuitry 1220 generates an output indicative of a predicted disconnect event in response to the calculated angle of rotation of the HMD with respect to the reference orientation exceeding a predetermined angle, then the control circuitry 1240 can be configured to instruct the HMD to display a first warning image comprising at least one graphical indicator indicating a direction of rotation for the HMD. A graphical indicator for indicating either a clockwise or an anti-clockwise direction of rotation for the HMD can be included in the first warning image. Therefore, in the case when the angle of rotation of the HMD with respect to the reference orientation exceeds a predetermined angle, corresponding to the cable becoming at least partially wrapped around the user's body, the first warning image can be displayed to provide visual guidance to the user to perform a rotational movement that reduces the likelihood of disconnect event for the wired connection by indicating a direction of rotation for unwrapping the cable from the user's body. In some examples two or more first warning images may be displayed for guiding the user to perform two or more movements in sequence, or a single first warning image may be displayed indicating a plurality of movements to be performed.

In embodiments of the disclosure, the HMD 1210 comprises one or more image sensors and the control circuitry 1240 is configured to instruct the HMD to display one or more images captured by one or more of the image sensors in response to the generated output. The HMD 1210 can be provided with one or more image sensors each configured to capture one or more images of the surrounding environment, and the control circuitry 1240 can be configured to instruct the HMD to display one or more of the captured images in response to an output generated by the processing circuitry 1220 indicative of any of a predicted disconnect event or a detected disconnect event. Therefore, in the case where a disconnect event is predicted, the HMD can be instructed to display one or more images of the user's surrounding environment so that the user can quickly understand their position and orientation with respect to their surroundings and thereby perform one or more movements (direction and/or rotational movements) to reduce the likelihood of the cable becoming disconnected. Similarly, in the case where a disconnect event is detected, the HMD can be instructed to display one or more images of the user's surrounding environment so that the user can quickly and reliably understand their position and orientation with respect to their surroundings and thereby perform one or more movements (direction and/or rotational movements) to reduce the likelihood of the cable becoming disconnected. As explained above, the display by the HMD of the one or more captured images may continue until a time at which a current position of the HMD no longer results in the processing circuitry 1220 predicting a disconnect event, or the display of the one or more captured images may continue until the user provides a user input requesting to stop display of the one or more captured images. In the case of a detected disconnect of a cable providing one or more power signals to the HMD, the above operations for powering one or more image sensors and displaying one or more captured images can be powered using a power source provided as part of the HMD, as discussed below. Hence more generally, one or more images of the user's surrounding environment can be displayed by the HMD in response to an output indicative of any of a predicted disconnect event or detected disconnect event.

In some examples, the control circuitry 1240 instructs the HMD to simultaneously display a first warning image and a captured image of the user's surroundings so that the user can see their surroundings whilst performing one or more guided movements. Similarly, in some examples the control circuitry 1240 instructs the HMD to simultaneously display a second warning image and a captured image of the user's surrounding so that the user can be informed that action is needed to reconnect the cable and can view the surrounding environment through the HMD.

Figure 15:
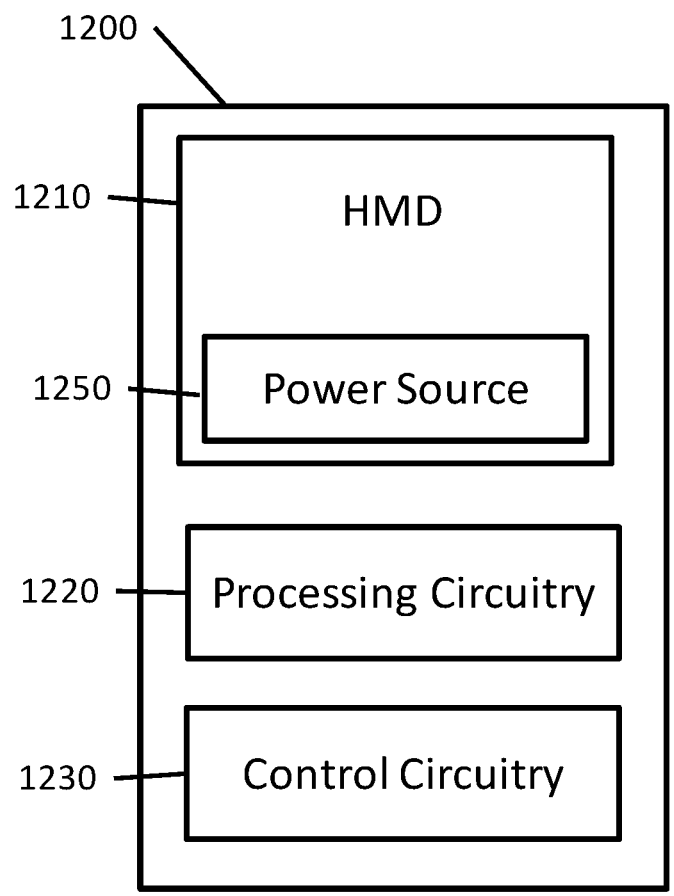
FIG. 15 schematically illustrates a system in which an HMD comprises a power source.

Referring now to FIG. 15, in embodiments of the disclosure the HMD 1210 comprises a power source 1250 for use by the HMD 1210 to perform one or more of the operations instructed by the control circuitry 1240 in response to the generated output indicative of the detected disconnect event. The HMD 1210 comprises a power source suitable for use by the HMD 1210 to power one or more of the operations instructed by the control circuitry 1240 so that one or more operations can be performed by the HMD 1210 even when a wired connection for providing one or more power signals to the HMD 1210 has been disconnected. The power source is a dedicated power source suitable for storing electrical charge and has a capacity (in units of Watt-hours or Amp-hours) suitable for powering one or more operations of the HMD for at least a predetermined period of time (e.g. 60 seconds). For example, the power source may be a battery or a supercapacitor.

Hence, for the case in which the HMD 1210 receives one or more power signals via a wired connection, the HMD 1210 can be configured to perform one or more operations instructed by the control circuitry 1240 in response to a generated output indicative of a predicted disconnect event using the one or more power signals received via the wired connection, and the HMD 1210 can be configured to perform one or more operations instructed by the control circuitry 1240 in response to a generated output indicative of a detected disconnect event using the power source 1250. In this way, the power source 1250 can be reserved for use only in the event of a detected disconnect event to allow the HMD 1210 to perform one or more operations for a predetermined period of time (e.g. 60 seconds) to provide a safe shutdown procedure for the HMD 1210 that improves the safety of the user wearing the HMD 1210.

In embodiments of the disclosure, the control circuitry 1240 is configured to instruct the HMD to output an in-game event for a video game in response to the generated output, wherein the in-game event is associated with a predetermined movement for the HMD 1210. In the case of the processing circuitry 1220 generating an output indicative of a predicted disconnect event whilst images for a video game are being displayed by the HMD 1210, the control circuitry 1240 can instruct the HMD 1210 to output the in-game event by outputting audio and displaying, in the one or more images for the video game, an in-game event so that the one or more images for the video game are adapted to increase a likelihood that a user wearing the HMD will perform a movement that results in reducing the likelihood of a disconnect event for the wired connection. Examples of such an in-game event include an explosion or a gun fire. It will be appreciated that other types of in-game events which cause the user to move in a direction and/or rotate their head can similarly be used and the type of in-game event is not particularly limited. For example, in the case where a rotation of the user's head and body in a clockwise direction is desired because the cable has become partially wrapped around the user, then the control circuitry 1240 can instruct the HMD 1210 to output an in-game event to a right-hand side of a display image (either to a right-hand side with respect to the centre of the displayed images or to a right-hand side with respect to the displayed images so that the in-game event is outside the user's current field of view for the video game thereby resulting in larger head rotation).

Figure 16:
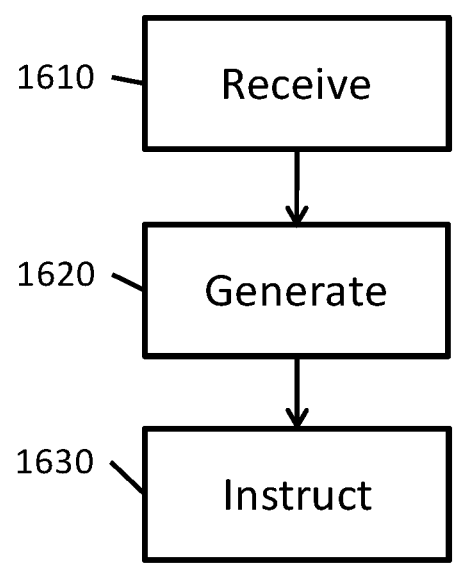
FIG. 16 is a schematic flowchart illustrating a data processing method.

FIG. 16 is a schematic flowchart illustrating a data processing method. The method comprising:

receiving (at a step 1610), by an HMD 1210, one or more signals via a wired connection with an external device;

generating (at a step 1620) an output indicative of at least one of a predicted disconnect event and a detected disconnect event for the wired connection; and instructing (at a step 1630) one or more operations to be performed by the HMD 1210 in response to the generated output.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Embodiments of the present disclosure may be implemented in accordance with any one or more of the following numbered clauses:

1. A system comprising:
    a head-mountable display (HMD) configured to receive one or more signals via a wired connection with an external device;
    processing circuitry to generate an output in response to at least one of a predicted disconnect event and a detected disconnect event for the wired connection; and
    control circuitry to instruct one or more operations to be performed by the HMD in response to the generated output.
2. The system according to clause 1, comprising one or more sensors to detect a position of the HMD, wherein the processing circuitry is configured to predict the disconnect event for the wired connection in dependence upon the position of the HMD.
3. The system according to clause 2, wherein one or more of the sensors is configured to detect an orientation of the HMD, wherein the processing circuitry is configured to predict the disconnect event for the wired connection in dependence upon the position and orientation of the HMD with respect to a predetermined reference position and a predetermined reference orientation.
4. The system according to clause 3, wherein the processing circuitry is configured to calculate a change in an angle of rotation of the HMD with respect to the predetermined reference orientation and to predict the disconnect event for the wired connection in dependence upon the change in the angle of rotation with respect to the predetermined reference orientation.
5. The system according to any one of clauses 2 to 4, wherein one or more of the sensors are configured to detect at least one of a position and an orientation of at least a portion of a cable forming the wired connection with the external device, and wherein the processing circuitry is configured to:
    generate a model for the cable in dependence upon at least one of the position and the orientation of the portion of the cable; and
    predict the disconnect event for the wired connection in dependence upon the model.
6. The system according to clause 5, wherein the cable comprises one or more optically detectable markers.

7. The system according to any one of clauses 2 to 6, wherein one or more of the sensors is configured to detect a position of an object and a position of the external device, and wherein the processing circuitry is configured to predict the disconnect event for the wired connection in dependence upon the position of the HMD, the position of the object and the position of the external device.

8. The system according to any preceding clause, wherein the processing circuitry is configured to detect the disconnect event for the wired connection in dependence upon at least one of a connection state for the wired connection at the HMD and a connection state for the wired connection at the external device.

9. The system according to any preceding clause, wherein the processing circuitry is configured to detect the disconnect event for the wired connection in dependence upon one or more from the list consisting of:

a change in signal amplitude of one or more of the signals communicated via the wired connection; and an output of a sensor for detecting a mating of a mating portion of either the HMD or the external device with a mating portion of a cable forming the wired connection.

10. The system according to any preceding clause, wherein the HMD comprises one or more image sensors and the control circuitry is configured to instruct the HMD to display one or more images captured by one or more of the image sensors in response to the generated output.

11. The system according to any preceding clause, wherein the control circuitry is configured to instruct the HMD to display one or more warning images in response to the generated output.

12. The system according to any preceding clause, wherein the generated output is indicative of either the predicted disconnect event or the detected disconnect event, and wherein the control circuitry is configured to instruct the HMD to display a first warning image in response to the generated output indicative of the predicted disconnect event and to instruct the HMD to display a second warning image in response to the generated output indicative of the detected disconnect event, wherein the first warning image is different to the second warning image.

13. The system according to clause 12, wherein the first warning image comprises one or more indicators for indicating a movement for the HMD.

14. The system according to any preceding clause, wherein the control circuitry is configured to instruct the HMD to display an in-game event for a video game in response to the generated output indicative of the predicted disconnect event, wherein the in-game event is associated with a predetermined movement for the HMD.

15. The system according to any preceding clause, wherein the generated output is indicative of the detected disconnect event, and wherein the HMD comprises a power source for use by the HMD to perform one or more of the operations instructed by the control circuitry in response to the generated output indicative of the detected disconnect event.

16. A data processing method comprising:

receiving, by an HMD, one or more signals via a wired connection with an external device;

generating an output in response to at least one of a predicted disconnect event and a detected disconnect event for the wired connection; and instructing one or more operations to be performed by the HMD in response to the generated output.

17. Computer software which, when executed by a computer, causes the computer to carry out the method of clause 16.

The invention claimed is:

1. A system comprising:
 a head-mountable display (HMD) configured to receive one or more signals via a wired connection with an external device;
 processing circuitry to generate an output in response to at least one of a predicted disconnect event for the wired connection;
 control circuitry to instruct one or more operations to be performed by the HMD in response to the generated output; and
 one or more sensors to detect a position of the HMD and at least one of a position and an orientation of at least a portion of a cable forming the wired connection with the external device,
 wherein the processing circuitry is configured to generate a model for the cable in dependence upon the position of the HMD and at least one of the position and the orientation of the portion of the cable; and to predict the disconnect event for the wired connection in dependence upon the model.

2. The system of claim 1, wherein the processing circuitry is configured to generate a second output in response to a detected disconnect event for the wired connection.

3. The system of claim 1, wherein one or more of the sensors is configured to detect an orientation of the HMD, wherein the processing circuitry is configured to predict the disconnect event for the wired connection in dependence upon the position and orientation of the HMD with respect to a predetermined reference position and a predetermined reference orientation.

4. The system of claim 3, wherein the processing circuitry is configured to calculate a change in an angle of rotation of the HMD with respect to the predetermined reference orientation and to predict the disconnect event for the wired connection in dependence upon the change in the angle of rotation with respect to the predetermined reference orientation.

5. The system of claim 1, wherein the cable comprises one or more optically detectable markers.

6. The system of claim 1, wherein one or more of the sensors is configured to detect a position of an object and a position of the external device, and wherein the processing circuitry is configured to predict the disconnect event for the wired connection in dependence upon the position of the HMD, the position of the object and the position of the external device.

7. The system of claim 2, wherein the processing circuitry is configured to detect the disconnect event for the wired connection in dependence upon at least one of a connection state for the wired connection at the HMD and a connection state for the wired connection at the external device.

8. The system of claim 2, wherein the processing circuitry is configured to detect the disconnect event for the wired connection in dependence upon one or more from the list consisting of:
 a change in signal amplitude of one or more of the signals communicated via the wired connection; and
 an output of a sensor for detecting a mating of a mating portion of either the HMD or the external device with a mating portion of a cable forming the wired connection.

9. The system of claim 1, wherein the HMD comprises one or more image sensors and the control circuitry is configured to instruct the HMD to display one or more images captured by one or more of the image sensors in response to the generated output.

10. The system of claim 1, wherein the control circuitry is configured to instruct the HMD to display one or more warning images in response to the generated output.

11. The system of claim 2, wherein the control circuitry is configured to instruct the HMD to display a first warning image in response to the generated output indicative of the predicted disconnect event and the control circuitry is configured to instruct the HMD to display a second warning image in response to the generated second output indicative of the detected disconnect event, wherein the first warning image is different to the second warning image.

12. The system of claim 11, wherein the first warning image comprises one or more indicators for indicating a movement for the HMD.

13. The system of claim 1, wherein the control circuitry is configured to instruct the HMD to display an in-game event for a video game in response to the generated output indicative of the predicted disconnect event, wherein the in-game event is associated with a predetermined movement for the HMD.

14. The system of claim 1, wherein the HMD comprises a power source for use by the HMD to perform one or more of the operations instructed by the control circuitry in response to the generated second output indicative of the detected disconnect event.

15. A data processing method comprising:
receiving, by an HMD, one or more signals via a wired connection with an external device;
generating an output in response to a predicted disconnect event for the wired connection;
instructing one or more operations to be performed by the HMD in response to the generated output;
detecting, by one or more sensors, a position of the HMD and at least one of a position and an orientation of at least a portion of a cable forming the wired connection with the external device;
generating a model for the cable in dependence upon the position of the HMD and at least one of the position and the orientation of the portion of the cable; and
predicting the disconnect event for the wired connection in dependence upon the model.

16. A non-transitory machine-readable storage medium which stores computer software which, when executed by a computer, causes the computer to perform a data processing method comprising:
receiving, by an HMD, one or more signals via a wired connection with an external device;
generating an output in response to a predicted disconnect event for the wired connection; and
instructing one or more operations to be performed by the HMD in response to the generated output;
detecting, by one or more sensors, a position of the HMD and at least one of a position and an orientation of at least a portion of a cable forming the wired connection with the external device;
generating a model for the cable in dependence upon the position of the HMD and at least one of the position and the orientation of the portion of the cable; and
predicting the disconnect event for the wired connection in dependence upon the model.

\* \* \* \* \*